United States Patent [19]

Brotzmann et al.

[11] 4,023,713
[45] May 17, 1977

[54] APPARATUS FOR BATCHWISE FEEDING OF POWDERS OR PARTICLES

[75] Inventors: Karl Brotzmann; Hans Georg Fassbinder, both of Sulzbach-Rosenberg; Paul Gerhard Mantey, Amburg; Johann Claus Grapengiesser; Alfred Hansen, both of Hamburg, all of Germany

[73] Assignee: Eisenwerk-Gesellschaft Maximilianshutte mbH, Sulzbach-Rosenberg, Germany

[22] Filed: Oct. 3, 1975

[21] Appl. No.: 619,538

Related U.S. Application Data

[63] Continuation of Ser. No. 447,418, March 1, 1974, abandoned.

[30] Foreign Application Priority Data

Mar. 2, 1973  Germany .......................... 2310358

[52] U.S. Cl. ............................... 222/193; 222/453
[51] Int. Cl.² .......................................... B67D 5/54
[58] Field of Search .......... 222/193, 445, 446, 447, 222/450, 453, 425

[56] References Cited

UNITED STATES PATENTS

| | | | |
|---|---|---|---|
| 2,521,347 | 9/1950 | Davis | 222/453 |
| 2,807,393 | 9/1957 | Metrailer et al. | 222/453 X |
| 2,949,275 | 8/1960 | Pro | 222/450 X |
| 3,528,588 | 9/1970 | Moore | 222/193 |

*Primary Examiner*—Stanley H. Tollberg
*Attorney, Agent, or Firm*—Lawrence I. Field

[57] ABSTRACT

Apparatus for batchwise feeding of powders or other particulate materials from a pressurized supply vessel with a sealable discharge orifice including a movable sealing-and-metering member and a seal against which it seals during periods of non-discharge.

19 Claims, 10 Drawing Figures

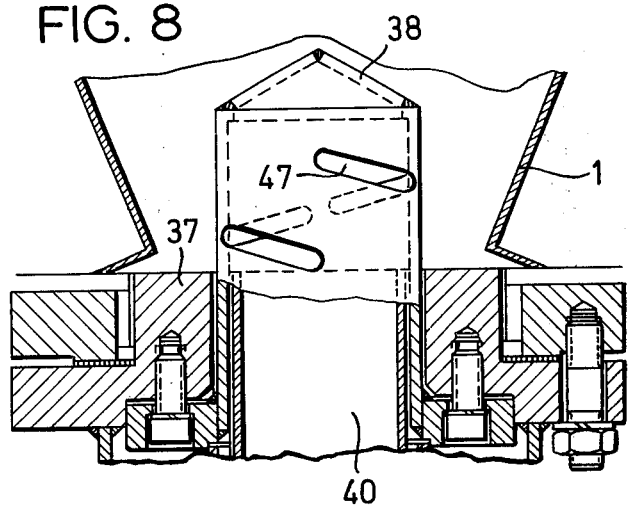
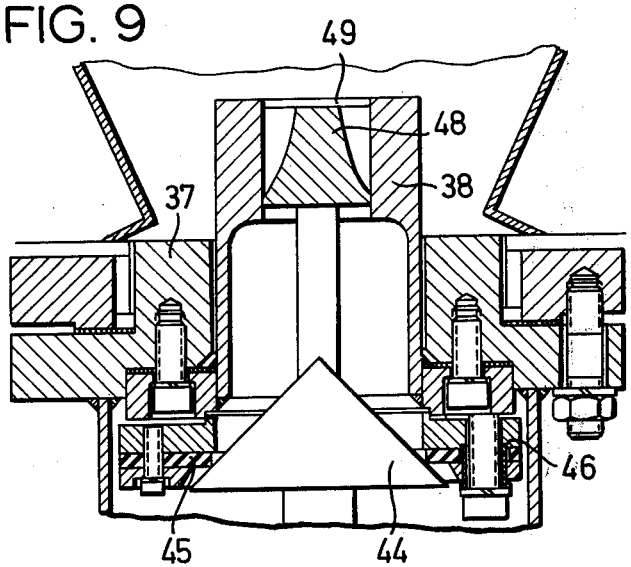

APPARATUS FOR BATCHWISE FEEDING OF POWDERS OR PARTICLES

This is a continuation, of application Ser. No. 447,418, filed Mar. 1, 1974 now abandoned.

This invention relates to an apparatus for feeding fine particles in batches from a supply vessel under pressure and with a sealable discharge orifice of variable cross-section.

Numerous processes require the use of particulate materials such as cement, lime dust, fertilizers, dust, metal and ceramic powders and slag forming agents in metallurgical processes, in which the materials are applied in metered manner. Consequently such materials are usually stored in supply vessels from which they can be withdrawn at either a constant or at a varying rate. For instance, when loading a gas stream with lime dust, special equipment is needed for providing the desired metered rates of the lime dust in the gas stream.

Supply vessels of constant discharge cross-section are known wherein the pressure is higher than ambient, and into which the particulate materials are delivered. By changing the pressure differential, the discharge cross-section remaining constant, one may change the rate of discharge. However this kind of rate control is limited insofar as the control range is restricted by the practically feasible pressure differential and furthermore, a high internal pressure is required, so that special safety measures must be taken. Lastly, the pressure-dependent rate control does not respond with sufficient rapidity in many applications.

It is also known how to maintain the pressure difference between the inside of the supply vessel and the discharge ambient constant, and how to control the amount discharged by changing the cross-section of the discharge orifice. Only minute pressure differences are required for this kind of control, which is responsive virtually without delay. However, when changing the discharge cross-section, there are appreciable difficulties because some kinds of particles — depending on their hardness and nature — may appreciably erode the equipment in which they are dispensed. Known wear-resistant materials usually do not permit hermetic sealing of the discharge orifice of the vessel with respect to gases. Elastic seals are not suitable because they will wear too rapidly due to the erosiveness of the particles. Attempts have been made to achieve a compromise between the requirements of high wear-resistance and elastic sealing but these have resulted in an insufficient life of those components which are particularly exposed to such wear.

It is therefore one object of the invention to provide an apparatus which permits batchwise feeding of particulate materials at a constant or varying rate and resistant to wear and at the same time providing gas-tight sealing of the supply vessel storing the goods with respect to the discharge ambient. These results are achieved by separate rate control and vessel hermeticity. More specifically, the invention consists of an apparatus with a movable sealing-and-metering body and a sealing means mounted downstream of said body.

This construction permits the use of a high wear-resistant material for the sealing and metering body and its mating surfaces, and a sufficiently elastic material for the sealing means. The sealing and metering body may cooperate with a wear-resistant bushing. A cleansing blow-system is provided to remove residual particles from the sealing surfaces of the sealing means following sealing of the discharge orifice of the supply vessel.

In the present invention, the discharge cross-section of the apparatus is preferably smaller than the flow cross-section of the sealing means, so that there are smaller flow speeds in the latter and therefore the wear due to particle velocity will be diminished.

Hard, or hardened metals and alloys such as stainless steel, hardened steel, tool steel, titanium alloys, carbide metals, also ceramics such as porcelain, glass, quartz, and materials based on silicic acid and alumina, such as silimanite, mullite, zirconium oxide, silicon carbide, sintered ceramics, fused corundum and cermets, are applicable. Selection of material, with respect to the sealing-and-metering body, is determined by wear resistance, there being no requirements in the apparatus of the invention that the sealing-and-metering body be seated in gas-tight manner in the discharge orifice of the supply vessel. This is advantageous because there is no requirement for tight tolerances and a play of even 0.1mm is permissable. Only the sealing means is required to seal to the supply vessel with respect to the discharge ambient; for instance, sealing a supply line for the particles which are put into the gas to be loaded. This may be achieved by means of commercially available elastic gaskets and conventional valve seats.

Preferably the apparatus of the invention consists of a cone located at the end of a push-rod and penetrating a sealing plate of the supply vessel, and of a valve head or assembly located downstream on the push-rod and operating in unison with a valve-seat disk with an elastic gasket. The valve-seat disk may be provided with radial channels connecting to a compressed-gas line, in order to remove residual particles from the sealing surfaces following sealing of the discharge orifice.

The chamber consists of an elastic bellows and comprises and axially displaceable cylinder carrying the push-rod and a displacement drive located outside the bellows. This displacement drive preferably consists of a positioning motor and of shafts or spindles driven by a chain drive, and connected to the shafts by means of a collar of the cylinder.

At least one compressed-gas line may discharge into the region of the valve disk. Furthermore, a length of pipe of smaller diameter than the diameter of the cylinder may be mounted underneath the sealing plate for influencing the stream of the material, so that the cylinder when in its upper end position will encompass the pipe segment.

In order to obtain easy flow-rate control, the sealing-and-metering body may consist of a cylindrical disk with several inclined planes spaced apart from each other. Another possible embodiment comprises a cylindrical sealing-and-metering body consisting of a guide-sleeve projecting from the sealing plate and provided with radial boreholes at different heights.

A metering slider may also be mounted below the sealing plate and may be provided with several corresponding apertures that can be of varying cross-sections in direction of displacement, so that the discharge cross-section is increased as the corresponding apertures are brought into coincidence. Further, the sealing organ also consists of a shutter rotating about a center axis.

In still another embodiment, of the invention, a sealing-and-metering cylinder is mounted on a fixed cylinder preferably penetrating the supply vessel. The fixed cylinder is sealed on one side, and is provided with apertures in its sleeve surface, and encloses a cylindrical slider with discharge apertures at the rear.

Preferably the foot of the cylinder-slider rests on a movable valve cone which operates in unison with a fixed gasket. The fixed cylinder may be provided with triangular apertures or helical slots for the purpose of transmitting the fluidized particles in the vessel. However, the front face of the fixed cylinder may also be open and the cylinder-slider may be designed as a piston.

In addition, a cock plug of horizontal axis of rotation may be mounted below a discharge aperture on the fixed cylinder which is open at the upper end, a separate drive being provided for said plug and for the sealing cone. Preferably the drive for the cock plug is of rotational design and that of the sealing cone is a differential pressure cylinder.

The invention will be further understood from the description which follows taken in conjunction with the drawings in which:

FIGS. 8, 9 and 10 are views showing still other feeder designs.

Figure 1:
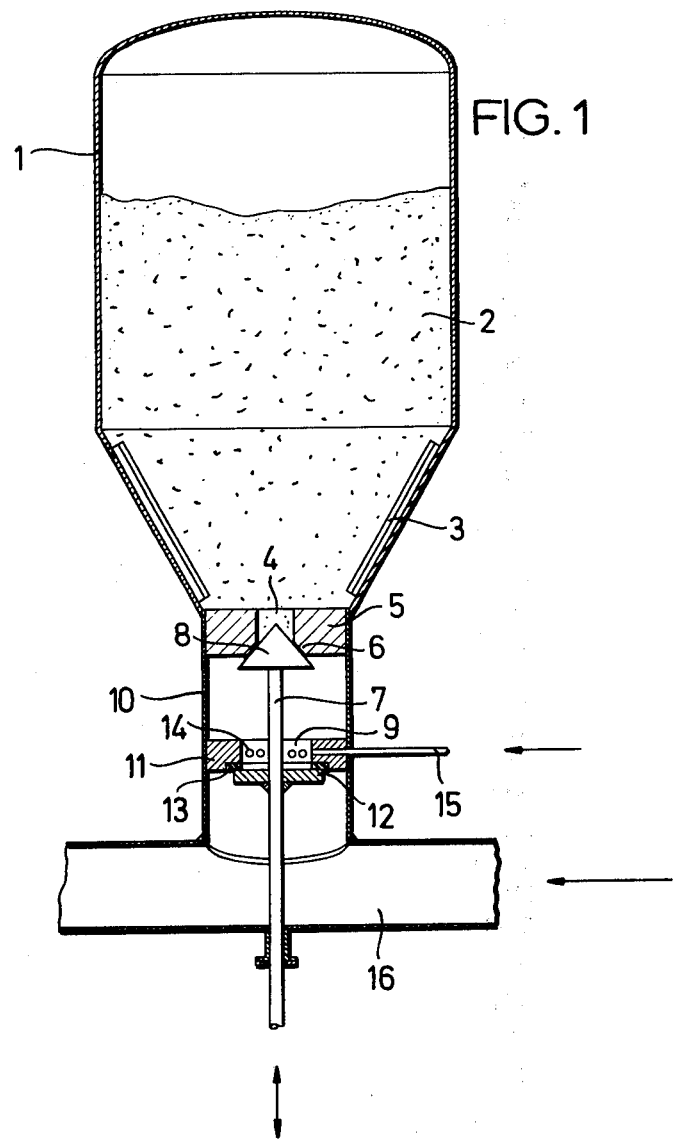
FIG. 1 is a lengthwise view partly in a section through one form of the apparatus according to the invention.

The fine grained material 2 is located in a supply vessel 1 and maintained fluid by means of a conventional apparatus 3. A discharge orifice 4, at the bottom of vessel 1, is located in a plate 5 which seals said vessel. A conical sealing-and-metering body 8 made of a wear-resistant material engages a wear-resistant, conical seat 6 formed in the orifice 4 of sealing plate 5. Sealing-and-metering body 8 is mounted on the end of a push-rod 7, which passes through aperture 9 of a valve seat disk 11 mounted in a chamber 10 and holds a valve head 12 underneath the valve seat disk. Valve seat head 12 is provided with an elastic gasket 13 of annular shape, which abuts valve 12 hermetically in the sealing position shown.

Valve seat disk 11 is provided with radial channels 14 to which compressed gas is supplied by means of lines 15. When push-rod 7 is lifted, i.e., before sealing, the discharging pressure gas will remove residual particles from valve head 12, so that same may abut gasket 13 in an airtight manner.

Chamber 10 discharges into a line 16 (discharge ambient) for the gas which is to be loaded with the particles. This is done as follows: the push-rod is moved downwards, by means of a drive (not shown), and thereby cone 8 will be moved out of its seat 6, and valve head 12 will be detached from gasket ring 13. The amount of material issuing from discharge orifice 4 will be determined by the spacing between the cone surface and conical seat 6. The moment it is desired to interrupt the flow of the granular material, push-rod 7 will be moved upward until the conical sealing-and-metering body 8 will fit to its seat 6. It is immaterial whether particles of granular materials are located on the surface of the cone and/or in seat 6, because sealing of the vessel inside or of the upper part of discharge chamber 10 is achieved solely by the joint operation of elastic gasket 13 and valve head 12.

Figure 2:
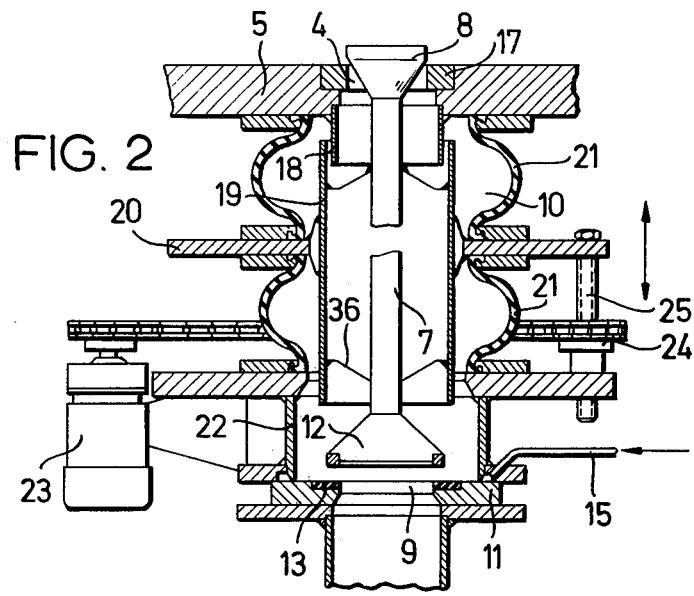
FIG. 2 is a fragmentary view of a modification of the apparatus.

The apparatus shown in FIG. 2 is also provided with a sealing plate 5, though in this instance the upper-end cylindrically designed sealing-and-metering cone 8 is mounted at the tip of a push-rod 7 and seats in a bushing 17. Push-rod 7 passes through a pipe segment 18 which is mounted to sealing plate 5, and further passes through an axially movable cylinder 19 provided with a collar 20 extending through a dual-part bellows. Push-rod 7 at its other end supports a valve head 12 operating jointly with a valve seat disk 11 and a gasket ring 13 located therein. A compressed gas line 15 is provided for blowing the sealing means 11, 12, 13 free of any residual particles falling into the region of the valve seat disk 11 in a chamber consisting of bellows 21 and of a depending tubular extension 22.

Opening and closing the discharge orifice 4 is achieved by means of a positioning motor 23 driving shafts 25 by means of a chain drive 24. Shafts 25 cause collar 20 to move vertically, thereby raising or lowering cylinder 19 and the push-rod connected to cylinder 19 by braces 36, in the up or down directions, depending on the rotational sense of positioning motor 23. The sealing-and-metering body 8 being of cylindrical shape in its upper part, valve head 12 first will clear elastic gasket ring 13 before there will be a transmission gap between the surface of the conical part of the sealing-and-metering body 8 and bushing 17. A transmission orifice in valve seat disk 11 corresponding in size to the annular gap at sealing-and-metering body 8 will therefore be obtained.

Figure 3:
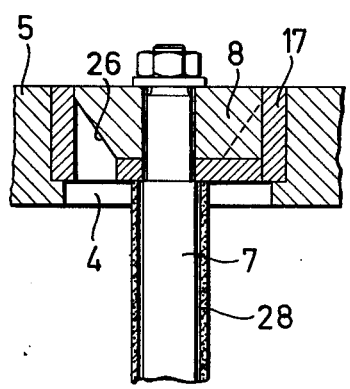
FIGS. 3 and 4 are fragmentary views showing further modification of the sealing-and-metering body of the apparatus.

When dispensing very hard particles, for instance refractory materials with high alumina contents, or sand and lime dust, sealing-and-metering body 8 may be designed to be cylindrical and may be provided with spaced slopes 26 of an angle of approximately 45°, said slopes clearing a corresponding number of discharge orifices when push-rod 7 is moved upwards in the design shown in FIG. 3.

An oxygen flow for refining pig iron was loaded with lime dust at the rate of 100 to 700 kg/min in a large-scale industrial facility by means of an apparatus of the kind shown in FIG. 3, wherein th internal diameter of guide bushing 17 was only 80mm, so that a clear discharge cross-section of 28 square centimeters was obtained when sealing-and-metering body 8 had been moved all the way up. The aperture cross-section of the metering organ was appreciably larger and in this instance amounted to 50 square centimeters. A pressure differential of 10 meters of water was maintained between the pressure inside supply vessel 1 and that in the oxygen supply line 16 (the discharge ambient). The displacement motion of push-rod 7, or of sealing-and-metering body 8, amounted to 30mm in this instance.

In another instance, the oxygen stream was loaded with up to 5,000 kg/min of lime dust. The maximum discharge orifice 4 required was 160 square centimeters, and hence the bushing 17 diameter was 200mm.

Figure 4:
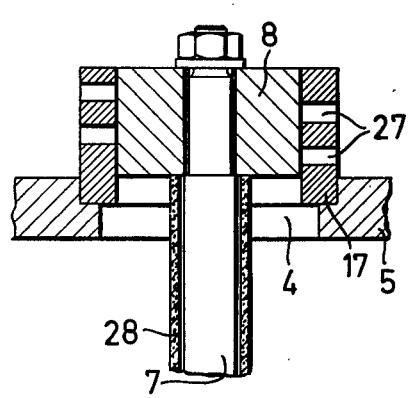

Another design is shown in FIG. 4 in which bushing 17 projects above sealing plate 5 and is provided with radial boreholes 27 at different heights, which will be uncovered consecutively by a cylindrical sealing-and-metering body 8 when push-rod 7 moves upward. A ceramic protecting tube 28 surrounds push-rod 7 for protection against erosion by the particles leaving discharge orifice 4.

Figure 5:
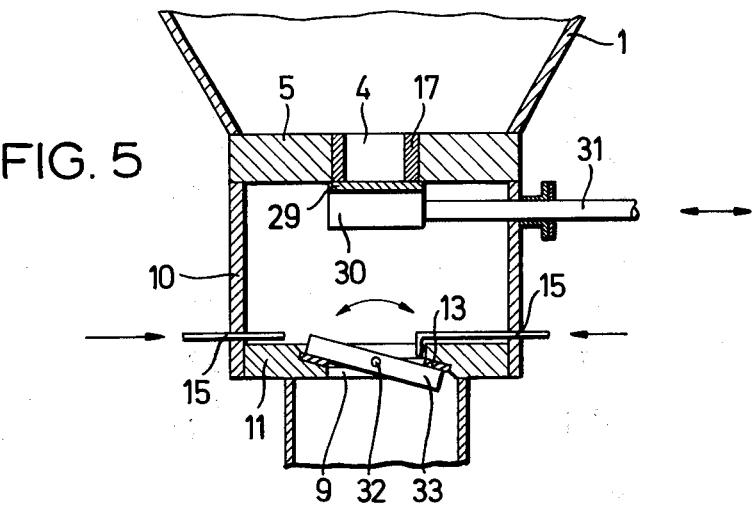
FIGS. 5 and 6 are fragmentary views of a further modification.

In the embodiment shown in FIG. 5, a plate 29 is located in front of the discharge orifice 4 of container or vessel 1. Plate 29 has holes (not shown) which correspond to holes in a sealing-and-metering body shown here as a slider 30 which is actuated by a rod 31 hermetically passing through the wall of chamber 10. The control characteristics of the slider, — or the output rate of the particles as a function of slider motion — depends on the shape of the orifices in the borehole-plate 29 and in the slider itself. Such punch-holes or boreholes for instance may be of triangular shape. Chamber 10 is closed by a valve seat disk 11 with elastic gasket ring 13, operating jointly with a rotational shutter 33 mounted on an axle 32. In this instance, too, sealing organ 11, 13, 32, 33 may be rid of residual particles by means of compressed gas supplied by line 15 prior to closing the valve. Actuation of slider 30 and rotational shutter 33 and the application of compressed gases may be achieved at an appropriate time by means of conventional pneumatic or electric control systems. Rotational shutter or swivel damper 33 may release the entire transmission cross-section prior to actuation of slider 30 and may be kept open until slider 30 again will have closed the discharge orifice 4.

Figure 6:
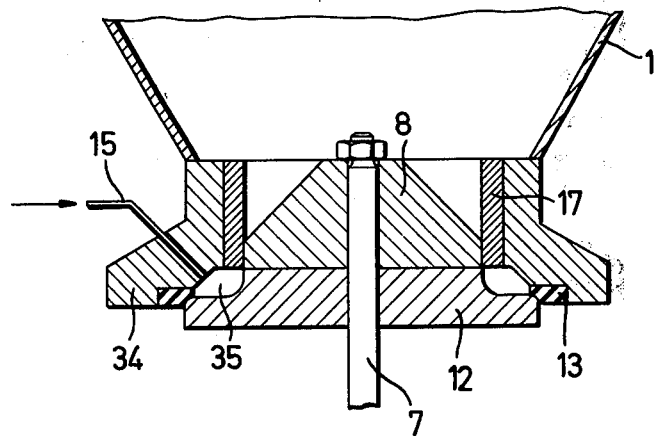

In the apparatus shown in FIG. 6, valve head 12 is located immediately behind sealing-and-metering body 8; elastic gasket 13 operating jointly with the valve head which is mounted in a sealing component 34 which also seats guide bushing 17. In this way, a smaller annular space 35 is provided between sealing component 34 and valve head 12. As in the other embodiments, a compressed gas line 15 for cleaning the valve head discharges gas into annular space 35.

Figure 7:
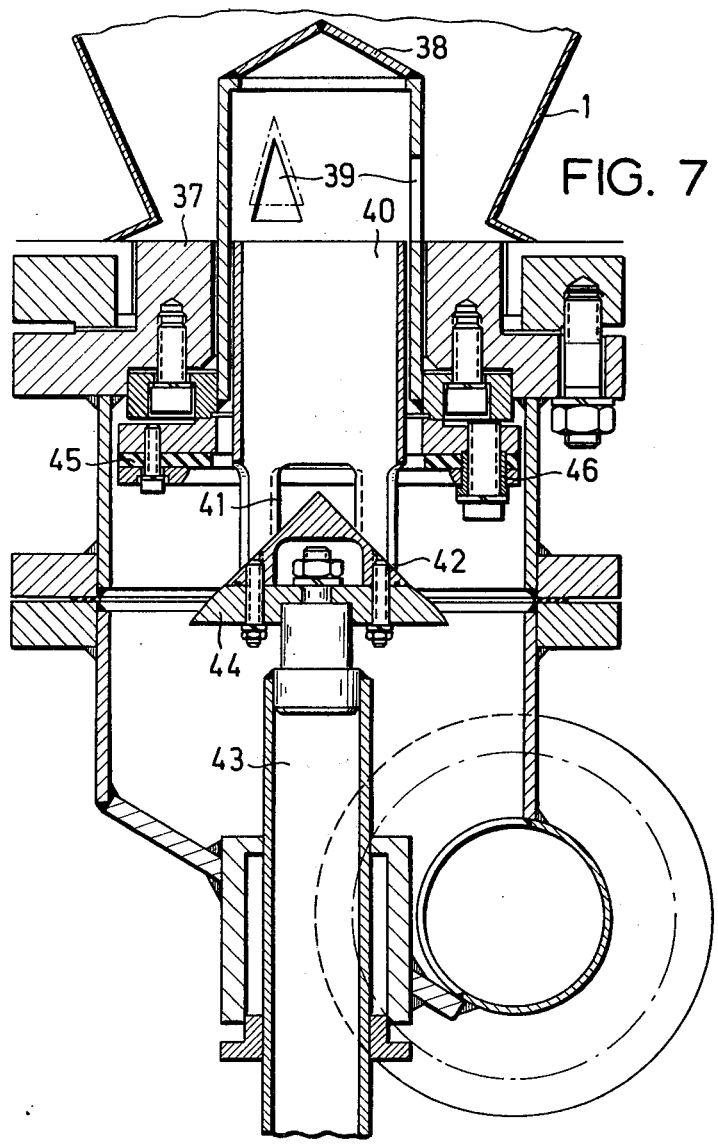
FIG. 7 is a lengthwise section showing still another embodiment of feeder equipment.

In the embodiment of the supply equipment shown in FIG. 7, a discharge plate 37 is mounted at the foot of supply vessel 1. A unilaterally closed, fixed cylinder 38 with inlet apertures 39 in the form of triangular slots mutually offset with respect to height passes through discharge plate 37 and projects above it and into vessel 1. A cylindrical slider 40 open at its top and provided at its lower end with discharge apertures 41 is located inside fixed cylinder 38. Slider 40 may move axially within cylinder 38.

The bottom end, or foot 42 of cylinder slider 40 rests on a valve cone 44 mounted on the free end of a push-rod 43. Foot 42 together with an elastic gasket ring 45 mounted to the lower side of discharge plate 37 forms the sealing means. The elastic gasket ring is located inside a cassette 46, allowing easy replacement. When push-rod 43 is moved by means of a drive (not shown), the surface of valve cone 44, when in its end position, will abut that edge of elastic gasket ring 45 which is facing it, while simultaneously the surface of cylinder slider 40 will cover the inlet apertures 39 of the fixed cylinder 38. When push-rod 43 moves back down, the surface of valve cone 44 will disengage from elastic gasket ring 45 before the upper edge of the cylinder slider 40 will reach the region of the uppermost of the inlet apertures 39, and before it will gradually uncover these. Reversely, inlet apertures 39 will first be closed when the push-rod is moving upward, before valve cone 44 will assume its uppermost position. The inlet apertures also may be designed as helical slots 47 as shown in FIG. 8.

In the embodiment of FIG. 9, a piston 48 with its rear end secured to a valve cone 44 is movable within a stationary cylinder 38. Unlike the embodiments shown in FIGS. 7 and 8, however, the stationary cylinder 38, in this instance is provided with a top orifice 49. The opening process from the closed position to that of the largest transmission cross-section is as follows: first valve cone 44 opens, then piston 48, which is rigidly connected to the valve cone, releases a certain discharge cross-section for the powder. This cross-section widens as a function of the piston path and of piston shape until the maximum open cross-section is reached.

Figure 10:
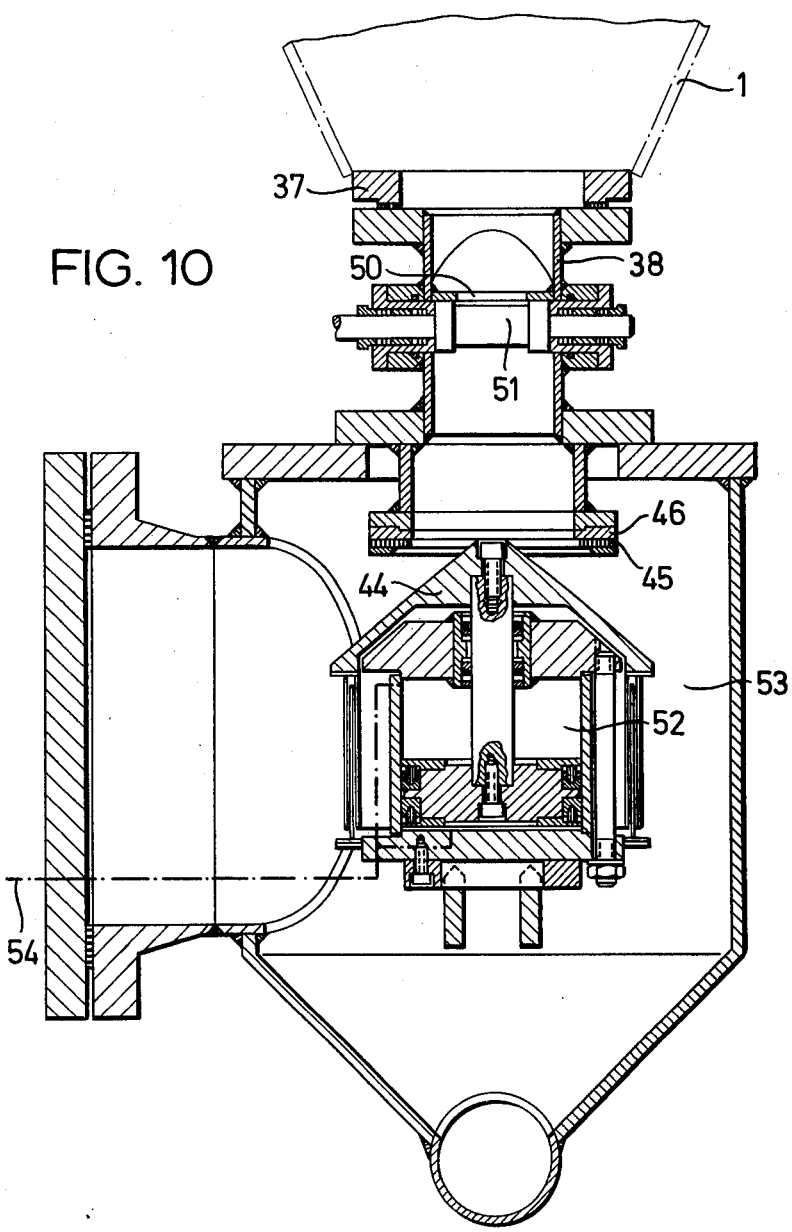

The embodiment shown in FIG. 10 includes a stationary cylinder 38 located underneath the discharge plate 37 at the bottom of the supply vessel 1. A rotating cock plug 51 is mounted below a discharge orifice 50. Rotation of plug 51 is about a horizontal axis. A valve cone 44 operating jointly with an elastic seal is independently mounted downstream from the plug. Valve cone 44 is actuated by means of a differential pressure cylinder 52, which is mounted in a pressure chamber 53, so that the pressure differential will effect the motion of valve cone 44. Control is performed by means of an inlet and a discharge line 54 connected to a source of fluid under pressure.

In each of the embodiments shown in FIGS. 7 through 10, the elastic seal of the sealing means is protected against wear from the particles or powder. As regards the embodiments of FIGS. 7 and 8 the elastic seals are screened from the particles by the cylinder slider, while the elastic seals of the embodiments of FIGS. 9 and 10 are located behind the flow path of the powder. Thereby long seal life is ensured.

Furthermore, all embodiments share this in common, that the discharge rate of the particulate material is determined by the positional adjustment of a sealing-and-metering body immediately in the vicinity of a vessel orifice and that sealing is shifted along the direction of flow and is by means of a special sealing means. Thereby both optimum design of the metering component and of the sealing means and selection of the most suitable material becomes practical.

We claim:

1. Apparatus for batch wise feeding of particles or powders from a pressurized supply container with a sealable discharge orifice comprising:
   a movable sealing and metering body;
   a sealing means mounted downstream of said sealing and metering body;
   a chamber wherein said sealing means is seated, wherein said chamber encloses an axially movable cylinder (19) mounted in said chamber surrounding a push rod (7) and equipped with an external displacement drive (23, 24, 25) means to move said cylinder axially;
   said push rod supporting said sealing and metering body at its upstream end.

2. Apparatus according to claim 1 wherein said chamber includes a double part bellows which encloses said axially movable cylinder.

3. Apparatus as defined by claim 1 wherein the displacement drive consists of a positioning motor (23) and of shafts or spindles (25) driven by a chain system (24) and connected to a collar (20) on cylinder (19).

4. Apparatus as defined by claim 1 wherein the sealing and metering body (8) consists of a cylindrical disk with several spaced slopes (26).

5. Apparatus as defined by claim 1 wherein the cylindrical sealing and metering body (8) is guided inside a guide bushing (17) passing through and projecting above sealing plate (5) and provided with radial boreholes at various heights.

6. Apparatus as defined by claim 1 wherein the sealing and metering body (8) is of conical design.

7. Apparatus as defined by claim 1 wherein:
said pushrod is movable and has an upstream end and a downstream end;
said movable sealing and metering body is wear resistant and is mounted on the upstream end of said pushrod;
the cross-section (4) of the discharge orifice of the supply container (1) being smaller than the flow cross-section (9) of the sealing means; and including in addition:
a wear resistant guide bushing (17) adjacent the discharge orifice of said supply container and disposed so as to guide said sealing and metering body; and
a cleansing blow system located adjacent to said sealing means, and adapted to blow a fluid under pressure across said sealing means.

8. Apparatus as defined by claim 7 wherein said cleansing blow system includes a compressed gas line (15) which discharges fluid in the region of said sealing means.

9. Apparatus as defined by claim 7 including in addition:
a sealing plate (5) through which said pushrod extends;
and a valve head (12) mounted downstream of said sealing and metering body on pushrod (7) and operating jointly with an elastic gasket (13) in a valve seat disk (11).

10. Apparatus as defined by claim 9, wherein the valve seat disk (11) is provided with radial channels (14) communicating with a compressed gas line (15).

11. Apparatus as defined in claim 8 including in addition a pipe segment (18) of lesser diameter than cylinder (19) mounted below sealing plate (5).

12. Apparatus as defined by claim 1, including in addition a stationary cylinder (38) enclosing said sealing-and-metering body (40, 51) and mounted at the foot of container (1).

13. Apparatus as defined by claim 12, wherein the stationary cylinder (38) penetrates container (1).

14. Apparatus as defined by claim 13, wherein the stationary cylinder (38) is closed on one side and is provided with inlet apertures (39) on its surface, and in that a cylinder-slider (40) with outlet orifices (41) is guided in the rear part.

15. Apparatus as defined by claim 13, wherein the foot (42) of cylinder-slider (40) rests on a movable valve-cone (44) which operates jointly with a stationary gasket ring (45).

16. Apparatus as defined by claim 12, including in addition a cock plug (51) rotating about a horizontal axis and mounted underneath an outlet orifice (50) on a stationary cylinder (38) which is open in the upward direction, said plug being provided with its own drive, and a valve cone (44) operating jointly with a gasket ring (45) and mounted downstream of said plug and also provided with its own drive.

17. Apparatus as defined by claim 16, wherein the drive of the cock plug is rotational in nature and the displacement drive of the valve cone (44) consists of a differential pressure cylinder (52) mounted inside a pressure chamber (53).

18. Apparatus as defined in claim 14 wherein the inlet apertures of said stationary cylinder are in the shape of triangles.

19. Apparatus as defined in claim 14 wherein the inlet apertures of said stationary cylinder are in the shape of helical slots.

* * * * *